US008005675B2

(12) United States Patent
Wasserblat et al.

(10) Patent No.: US 8,005,675 B2
(45) Date of Patent: Aug. 23, 2011

(54) APPARATUS AND METHOD FOR AUDIO ANALYSIS

(75) Inventors: Moshe Wasserblat, Modein (IL); Oren Pereg, Ra'anana (IL)

(73) Assignee: Nice Systems, Ltd., Ra'anana (IL)

( * ) Notice: Subject to any disclaimer, the term of this patent is extended or adjusted under 35 U.S.C. 154(b) by 1273 days.

(21) Appl. No.: 11/083,343

(22) Filed: Mar. 17, 2005

(65) Prior Publication Data

US 2006/0212295 A1 Sep. 21, 2006

(51) Int. Cl.
*G10L 15/04* (2006.01)

(52) U.S. Cl. ....................................................... 704/252

(58) Field of Classification Search .................. 704/231, 704/252; 379/265.02; 381/94.3; 455/556.1
See application file for complete search history.

(56) References Cited

U.S. PATENT DOCUMENTS

| | | | |
|---|---|---|---|
| 4,145,715 A | 3/1979 | Clever | |
| 4,527,151 A | 7/1985 | Byrne | |
| 4,821,118 A | 4/1989 | Lafreniere | |
| 5,051,827 A | 9/1991 | Fairhurst | |
| 5,091,780 A | 2/1992 | Pomerleau | |
| 5,303,045 A | 4/1994 | Richards et al. | |
| 5,307,170 A | 4/1994 | Itsumi et al. | |
| 5,353,168 A | 10/1994 | Crick | |
| 5,404,170 A | 4/1995 | Keating | |
| 5,491,511 A | 2/1996 | Odle | |
| 5,519,446 A | 5/1996 | Lee | |
| 5,734,441 A | 3/1998 | Kondo et al. | |
| 5,742,349 A | 4/1998 | Choi et al. | |
| 5,751,346 A | 5/1998 | Dozier et al. | |
| 5,790,096 A | 8/1998 | Hill, Jr. | |
| 5,796,439 A | 8/1998 | Hewett et al. | |
| 5,847,755 A | 12/1998 | Wixson et al. | |
| 5,895,453 A | 4/1999 | Cook et al. | |
| 5,920,338 A | 7/1999 | Katz | |
| 5,987,320 A * | 11/1999 | Bobick | 455/423 |
| 6,014,647 A | 1/2000 | Nizzar et al. | |
| 6,028,626 A | 2/2000 | Aviv et al. | |
| 6,031,573 A | 2/2000 | MacCormack et al. | |
| 6,037,991 A | 3/2000 | Thro et al. | |
| 6,070,142 A | 5/2000 | McDonough et al. | |
| 6,081,606 A | 6/2000 | Hansen et al. | |
| 6,092,197 A | 7/2000 | Coueignoux | |
| 6,094,227 A | 7/2000 | Guimier | |
| 6,097,429 A | 8/2000 | Seely et al. | |

(Continued)

FOREIGN PATENT DOCUMENTS

DE 10358333 7/2005

(Continued)

OTHER PUBLICATIONS

PR Newswire, Recognition Systems and Hyperion to Provide Closed Loop CRM Analytic Applications, Nov. 16, 1999 (previously listed as Nov. 17, 1999).

(Continued)

*Primary Examiner* — Michael N Opsasnick
(74) *Attorney, Agent, or Firm* — Ohlandt, Greeley, Ruggiero & Perle, L.L.P.

(57) ABSTRACT

An apparatus and method for an improved audio analysis process is disclosed. The improvement concerns the accuracy level of the results and the rate of false alarms produced by the audio analysis process. The proposed apparatus and method provides a three-stage audio analysis route. The three-stage analysis process includes a pre-analysis stage, a main analysis stage and a post analysis stage.

34 Claims, 3 Drawing Sheets

U.S. PATENT DOCUMENTS

| | | | | |
|---|---|---|---|---|
| 6,111,610 | A | 8/2000 | Faroudja | |
| 6,134,530 | A | 10/2000 | Bunting et al. | |
| 6,138,139 | A | 10/2000 | Beck et al. | |
| 6,151,576 | A * | 11/2000 | Warnock et al. | 704/260 |
| 6,167,395 | A | 12/2000 | Beck et al. | |
| 6,170,011 | B1 | 1/2001 | Macleod Beck et al. | |
| 6,185,527 | B1 * | 2/2001 | Petkovic et al. | 704/231 |
| 6,212,178 | B1 | 4/2001 | Beck | |
| 6,230,197 | B1 | 5/2001 | Beck et al. | |
| 6,292,830 | B1 * | 9/2001 | Taylor et al. | 709/224 |
| 6,295,367 | B1 | 9/2001 | Crabtree et al. | |
| 6,327,343 | B1 | 12/2001 | Epstein et al. | |
| 6,330,025 | B1 | 12/2001 | Arazi et al. | |
| 6,345,305 | B1 | 2/2002 | Beck et al. | |
| 6,404,857 | B1 | 6/2002 | Blair et al. | |
| 6,427,137 | B2 | 7/2002 | Petrushin | |
| 6,441,734 | B1 | 8/2002 | Gutta et al. | |
| 6,549,613 | B1 | 4/2003 | Dikmen | |
| 6,559,769 | B2 | 5/2003 | Anthony et al. | |
| 6,570,608 | B1 | 5/2003 | Tserng | |
| 6,604,108 | B1 | 8/2003 | Nitahara | |
| 6,609,092 | B1 * | 8/2003 | Ghitza et al. | 704/226 |
| 6,628,835 | B1 | 9/2003 | Brill et al. | |
| 6,651,041 | B1 * | 11/2003 | Juric | 704/228 |
| 6,704,409 | B1 | 3/2004 | Dilip et al. | |
| 6,928,592 | B2 * | 8/2005 | Barrett | 714/715 |
| 6,965,597 | B1 * | 11/2005 | Conway | 370/389 |
| 7,076,427 | B2 | 7/2006 | Scarano et al. | |
| 7,085,230 | B2 * | 8/2006 | Hardy | 370/232 |
| 7,099,282 | B1 * | 8/2006 | Hardy | 370/252 |
| 7,103,806 | B1 | 9/2006 | Horvitz | |
| 7,313,517 | B2 * | 12/2007 | Beerends et al. | 704/200 |
| 7,327,985 | B2 * | 2/2008 | Morfitt et al. | 455/67.11 |
| 7,376,132 | B2 * | 5/2008 | Conway | 370/389 |
| 2001/0043697 | A1 | 11/2001 | Cox et al. | |
| 2001/0052081 | A1 | 12/2001 | McKibben et al. | |
| 2002/0005898 | A1 | 1/2002 | Kawada et al. | |
| 2002/0010705 | A1 | 1/2002 | Park et al. | |
| 2002/0059283 | A1 | 5/2002 | Shapiro et al. | |
| 2002/0064149 | A1 * | 5/2002 | Elliott et al. | 370/352 |
| 2002/0087385 | A1 | 7/2002 | Vincent | |
| 2003/0033145 | A1 | 2/2003 | Petrushin | |
| 2003/0059016 | A1 | 3/2003 | Lieberman et al. | |
| 2003/0065995 | A1 * | 4/2003 | Barrett | 714/715 |
| 2003/0128099 | A1 | 7/2003 | Cockerham | |
| 2003/0154081 | A1 * | 8/2003 | Chu et al. | 704/266 |
| 2003/0163360 | A1 | 8/2003 | Galvin | |
| 2004/0042617 | A1 * | 3/2004 | Beerends et al. | 379/416 |
| 2004/0078197 | A1 * | 4/2004 | Beerends et al. | 704/225 |
| 2004/0098295 | A1 | 5/2004 | Sarlay et al. | |
| 2004/0141508 | A1 | 7/2004 | Schoeneberger et al. | |
| 2004/0161133 | A1 | 8/2004 | Elazar et al. | |
| 2004/0186731 | A1 * | 9/2004 | Takahashi et al. | 704/277 |
| 2004/0249650 | A1 | 12/2004 | Freedman et al. | |
| 2005/0060155 | A1 * | 3/2005 | Chu et al. | 704/269 |
| 2006/0093135 | A1 | 5/2006 | Fiatal et al. | |
| 2006/0171543 | A1 * | 8/2006 | Beerends et al. | 381/58 |

FOREIGN PATENT DOCUMENTS

| | | | |
|---|---|---|---|
| EP | 1 484 892 | | 12/2004 |
| GB | 9916430.3 | | 7/1999 |
| IL | 03 067884 | A1 | 8/2003 |
| WO | 95 29470 | A | 11/1995 |
| WO | 98 01838 | A | 1/1998 |
| WO | WO 00/73996 | | 12/2000 |
| WO | WO 02/37856 | | 5/2002 |
| WO | 03 013113 | A2 | 2/2003 |
| WO | 03/067360 | A2 | 8/2003 |
| WO | WO 2004 091250 | | 10/2004 |

OTHER PUBLICATIONS

Article Sertainty—Automated Quality Monitoring—SER Solutions, Inc.—21680 Ridgetop Circle Dulles, VA—WWW.ser.com.

Article Sertainty—Agent Performance Optimization—2005 SE Solutions, Inc.

Lawrence P. Mark SER—White Paper—Sertainty Quality Assurance—2003-2005 SER Solutions Inc.

Douglas A. Reynolds Robust Text Independent Speaker Identification Using Gaussian Mixture Speaker Models—IEEE Transactions on Speech and Audio Processing, vol. 3, No. 1, Jan. 1995.

Chaudhari, Navratil, Ramaswamy, and Maes Very Large Population Text-Independent Speaker Identification Using Transformation Enhanced Multi-Grained Models—Upendra V. Chaudhari, Jiri Navratil, Ganesh N. Ramaswamy, and Stephane H. Maes—IBM T.J. Watson Research Center—Oct. 2000.

Douglas A. Reynolds, Thomas F. Quatieri, Robert B. Dunn Speaker Verification Using Adapted Gaussian Mixture Models, Digital Signal Processing vol. 10, Nos. 1-3, Jan./Apr./Jul. 2000, pp. 19-41.

Yaniv Zigel and Moshe Wasserblat—How to deal with multiple-targets in speaker identification systems? 2006 IEEE Odyssey—The Speaker and Language Recognition Workshop, pp. 1-7.

Frederic Bimbot et al—A Tutorial on Text-Independent Speaker Verification EURASIP Journal on Applied Signal Processing 2004:4, 430-451.

Yeshwant K. Muthusamy et al—Reviewing Automatic Language Identification IEEE Signal Processing Magazine 33-41 (Oct. 1994).

Marc A. Zissman—Comparison of Four Approaches to Automatic Language Identification of Telephone Speech; IEEE Transactions on Speech and Audio Processing, vol. 4, No. 1, pp. 31-44, Jan. 1996.

N. Amir., S. Ron , Towards an Automatic Classification of Emotions in Speech—Communications Engineering Department, Center for Technological Education Holon, 52 Golomb St., Holon, 58102, Israel, (no date on document).

NiceVision—Secure your Vision, a prospect by NICE Systems, Ltd.

NICE Systems announces New Aviation Security Initiative, reprinted from Security Technology & Design.

(Hebrew) "the Camera That Never Sleeps" from Yediot Aharonot.

Freedman, I. Closing the Contact Center Quality Loop with Customer Experience Management, Customer Interaction Solutions, vol. 19, No. 9, Mar. 2001.

PR Newswire, NICE Redefines Customer Interactions with Launch of Customer Experience Management, Jun. 13, 2000.

PR Newswire, Recognition Systems and Hyperion to Provide Closed Loop CRM Analytic Applications, Nov. 17, 1999.

Financial companies want to turn regulatory burden into competitive advantage, Feb. 24, 2003, printed from InformationWeek, http://www.informationweek.com/story/IWK20030223S0002.

SEDOR—Internet pages form http://www.dallmeier-electronic.com.

(Hebrew) print from Haaretz, "The Computer at the Other End of the Line", Feb. 17, 2002.

* cited by examiner

APPARATUS AND METHOD FOR AUDIO ANALYSIS

BACKGROUND OF THE INVENTION

1. Field of the Invention

The present invention relates to audio analysis in general, and more specifically to audio content analysis in audio interaction-extensive working environments.

2. Discussion of the Related Art

Audio analysis refers to the extraction of information and meaning from audio signals for analysis, classification, storage, retrieval, synthesis, and the like. When processing audio interactions, the functionality of audio analysis is directed to the extraction, breakdown, examination, and evaluation of the content within the interactions. Audio analysis could be performed in audio interaction-extensive working environments, such as for example call centers or financial institutions, in order to extract useful information associated with or embedded within captured or recorded audio signals carrying interactions. Such information is, for example, recognized speech or recognized speaker extracted from the audio characteristics. The performance analysis, in terms of accuracy and detection rates, depends directly on the quality and integrity of the captured and/or recorded signals carrying the audio interaction, on the availability and integrity of additional meta-information, and on the efficiency of the computer programs that constitute the audio analysis process. An ongoing effort is invested in order to improve the accuracy, detection rates) and efficiency of the programs performing the analysis.

SUMMARY OF THE PRESENT INVENTION

In accordance with the present invention, there is thus provided a method for improving the performance levels of one ore more audio analysis engine, designed to process one or more audio interaction segments captured in an environment, the method comprising the steps of examining the audio interaction segments, and estimating the quality of the performance of the audio analysis engine based on the results of the examination of the audio interaction segment. The environment is a call center or in a financial institution. The method further comprises the steps of processing the audio interaction segment by the audio analysis engine, evaluating one or more results of the audio analysis engine processing the audio interaction segment, and discarding the at least one result of the audio analysis engine processing the audio interaction segment. The method further comprises the step of filtering the audio interaction segment from being processed by the audio analysis engine, based on the quality estimated for the audio interaction segment. The quality is estimated based on any one of the following: a result of the examination of the audio interaction segment, the audio analysis engine, one or more thresholds, or estimated integrity of the one audio interaction segment. The threshold can be associated with the workload of the environment, or with environmental estimated performance of the audio analysis engine. The method further comprising classifying one or more audio interactions into segments. The segments can of predefined types, including any one of the following: speech, music, tones, noise, or silence. Discarding the result of the audio analysis engine processing the segment further comprises disqualifying the at least one result. The method further comprising determining an environmental estimated performance of the audio analysis engine. The quality of the performance of the audio analysis engine is determined by one ore more quality parameter of the audio signal of the interaction segment, or by a weighted sum of the one ore more quality parameters of the audio signal of the audio interaction segment. The weighted sum employs weights acquired during a training stage or weights determined using linear prediction. The evaluating of the one or more results comprises one or more of the following: verifying the results with a second audio analysis engine, verifying the results with an additional activation of the first audio analysis engine, receiving a certainty level provided by the audio analysis engine for each result, calculating the workload of the environment, calculating the results previously acquired in the environment, and receiving the computer telephony information related to the interaction.

Another aspect of the present invention relates to an apparatus for improving the accuracy levels of an audio analysis engine designed to process an audio interaction segment captured in an environment, the apparatus comprising a quality evaluator component for determining the quality of the audio interaction segment, and a pre-analysis performance estimator and rule engine component for evaluating the performance of the audio analysis engine designed to process the audio interaction segment, prior to processing the audio interaction segment by the audio analysis engine, and passing the audio interaction segment to the audio analysis engine according to an at least one rule. The environment is a call center or a financial institute. The rule engine component compares the estimated performance of the audio analysis engine processing the audio interaction segment to one or more thresholds. The apparatus further comprises an audio classification component for classifying an audio interaction into segments. The apparatus comprises a component for determining an environmental estimated performance of the audio analysis engine. The apparatus further comprises an audio interaction analysis performance estimator component for determining the value of an at last one quality parameter for the at least one audio interaction segment. The apparatus further comprises a statistical quality profile calculator component for generating a statistical quality profile of the environment. The statistical quality profile calculator component determines one ore more weights to be associated with one or more quality parameters. The apparatus further comprising an analysis performance estimator component for estimating the environmental performance of the audio analysis engine. The apparatus further comprising a database. The apparatus further comprising a post-processing rule engine for determining whether to qualify, disqualify, re-analyze or verify one or more results reported by the audio analysis engine processing the audio interaction segment.

Yet another aspect of the present invention relates to an apparatus for improving one or more results provided by an audio analysis engine designed to process one or more audio interaction segments captured in an environment, subsequent to the processing, the apparatus comprising a post-processing rule engine for determining whether to qualify, disqualify, re-analyze or verify the results. The environment is a call center or a financial institution. The apparatus further comprising a results certainty examiner component for determining the certainty of the results. The apparatus further comprising a focused post analyzer component for re-analyzing the result. The apparatus wherein the rule engine comprises one or more rules for considering the workload of the environment. The apparatus wherein the rule engine comprises one or more rules for considering the results previously acquired in the environment. The apparatus wherein the rule engine comprises one or more rules for considering computer telephony information related to the audio interaction segment. The apparatus further comprising a quality evaluator component for determining the quality of the audio interaction segment, and a pre-analysis performance estimator and rule engine component for evaluating the performance of the audio analysis engine designed to process the audio interaction segment, prior to processing the audio interaction segment by the one audio analysis engine and passing the audio interaction segment to the audio analysis engine according to a rule.

Yet another aspect of the present invention relates to an apparatus for improving a result provided by an at least one first audio analysis engine designed to process an at least one audio interaction segment captured in an environment, the apparatus comprising a quality evaluator component for determining the quality of the audio interaction segment, and a pre-analysis performance estimator and rule engine component for evaluating the performance of the audio analysis engine designed to process the audio interaction segment, prior to processing the audio interaction segment by the audio analysis engine and passing the audio interaction segment to the audio analysis engine according to a rule, and a post-processing rule engine for determining whether to qualify, disqualify, re-analyze or verify the result.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENT

An apparatus and method for an improved audio analysis process is disclosed. The apparatus is designed to work in an audio-interaction intensive environment, such as, but not limited to call centers and financial institutions, for example a bank, a credit card company, a trading floor, an insurance company, a health care company or the like. The improvement concerns the accuracy level of the results and the rate of false alarms produced by the audio analysis process. The proposed apparatus and method provides a three-stage audio analysis route. The three-stage analysis process includes a pre-analysis stage, a main analysis stage and a post analysis stage. In the pre-analysis stage the quality parameters, structural integrity and estimated quality and accuracy of the results of the audio analysis engines on the audio interactions are examined. Low quality or low integrity interactions or parts thereof, or interactions with low estimated quality and accuracy of audio analysis engines are discarded via a filtering mechanism, since the cost-effectiveness of running the engines on such interactions is expected to be low. A pre-analysis rules engine associated with the pre-analysis stage provides the filtering mechanism that will prevent the transfer of the inappropriate interactions or parts thereof to the main audio analysis stage. Additionally, the pre-processing stage takes into account the overall state of the environment. For example, if a certain quota of audio should be processed during a certain time frame, and the system is behind-schedule, i.e., the proportion of interactions processed is lower than the proportion of time elapsed, the system will compromise and lower the thresholds, thus allowing calls with lower quality, integrity, or predicted accuracy of results, to be processed, too, to meet the goals. In the post-analysis stage the analysis results provided by the main analysis stage are evaluated and a set of result-specific procedures are performed. The result-specific processes could include result qualification, disqualification, verification or modification. Result verification or modification can be performed by repeated activation of audio analysis via identical analysis engines utilizing different parameters or via alternative analysis engines, or by integrating results emerging from various analysis engines. In the context of the disclosed invention, "performance" relates to the quality, as expressed by the accuracy and detection rates of results generated by audio analysis engines, rather than to the efficiency of the engines or the computing platforms.

Figure 1:
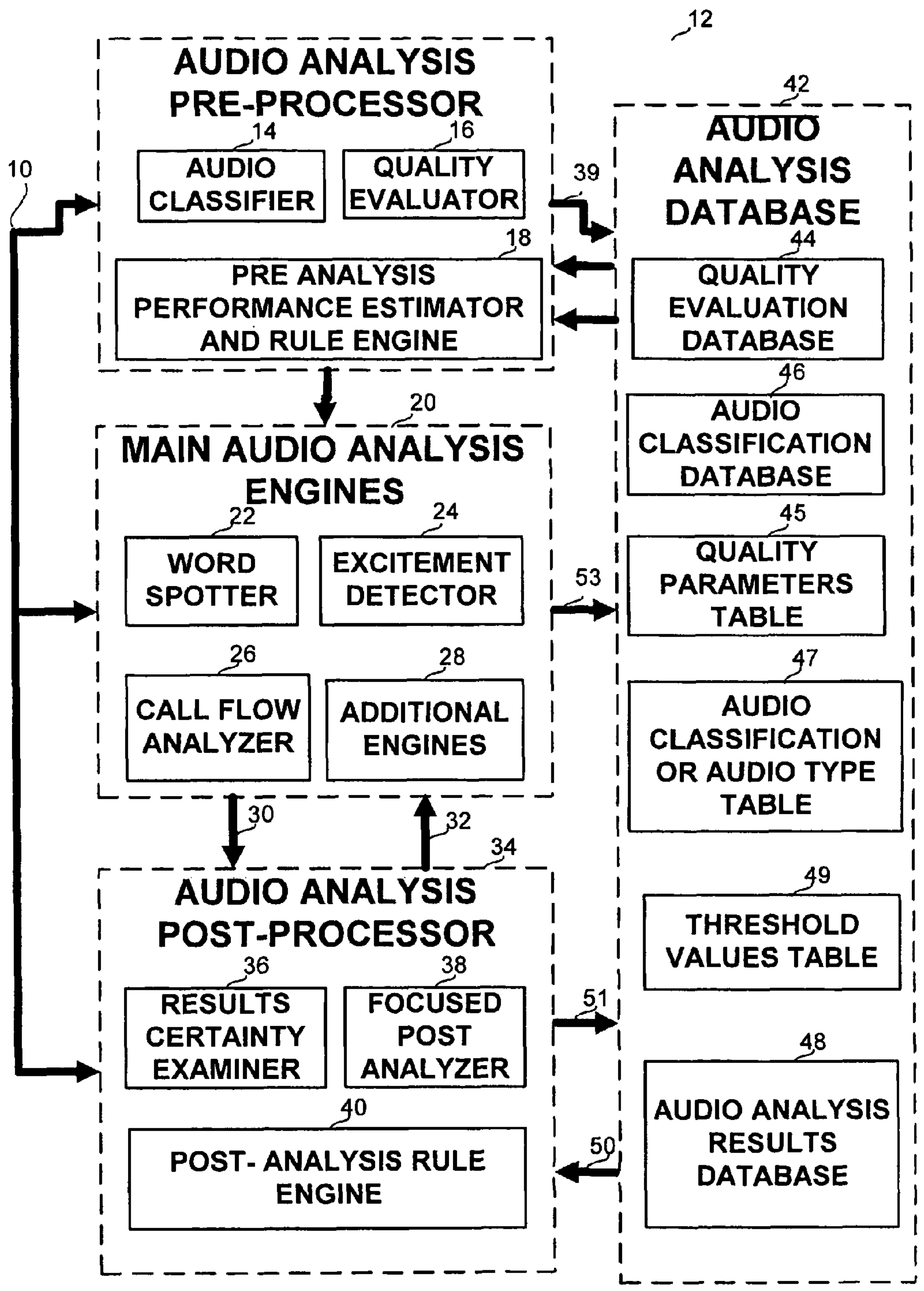
FIG. 1 is a schematic block diagram describing the components of the proposed apparatus, in accordance with a preferred embodiment of the present invention.

Referring now to FIG. 1 the proposed audio analysis apparatus includes an audio analysis pre-processor 12, a set of main audio analysis engines 20, an audio analysis post-processor 34, and an audio analysis database 42. The audio analysis pre-processor 12 includes an audio classifier component 14, an interaction-quality evaluator component 16, and a pre-analysis performance estimator and rule engine 18. Main audio analysis engines 20 include a word spotting component 22, an excitement detecting component 24, a call flow analyzer 26 and additional audio analysis engines 28, such as a voice recognition engine, a full transcription engine, a topic identification engine, an engine that combines elements of audio and text, and the like. The audio analysis post-processor 34 includes a results certainty examiner component 36, a focused post analyzer component 38, and a post-analysis rules engine 40. The audio analysis database 42 includes a quality evaluation database 44, an audio classification database 46, an audio classification or audio type table 47, a threshold values table 49, a quality parameters table 45, and an audio analysis results database 48. Other tables and data structures may exist within the audio analysis database, containing predetermined data, audio data, meta data or results relating to a specific interaction or to a specific engine, and others. Audio analysis pre-processor 12 is responsible for the evaluation of the quality and the integrity of the audio signal segments representing audio interactions that are received from an audio source 10. The audio source 10 could be a microphone, a telephone handset, a dynamic audio file temporarily stored in a volatile memory device, a semi-permanent audio recording stored on a specific storage device, and the like. Audio analysis pre-processor 12 is further responsible for the type classification of the audio interaction segments represented by the audio signal and for the estimation of performance of audio analysis engines on the interactions or segments thereof. The quality and the integrity of the audio signal and the efficiency of the audio analysis processes have a major influence on the accuracy level of the results produced by the analysis. In the preferred embodiment of the present invention the quality level and the integrity measurement are evaluated prior to the activation of the main audio analysis engines that constitute the main audio analysis. The signal quality and signal integrity measurement parameters associated with the audio interaction segments are stored in the quality evaluation database 44, which is associated with the audio analysis database 42. The quality and integrity measurement parameters are stored 39 in order to provide for their subsequent utilization by pre-analysis performance estimator and rule engine 18 in a subsequent step of the pre-processing. The quality and integrity measurement parameters are further utilized for the calculation of the statistical quality profile of the audio interactions in the specific working environment. Audio classifier component 14 is responsible for the classification of the audio segments into various audio types, such as speech, music, tones, noise, silence and the like. Audio classifier component 14 is further responsible for the indexing of the segments of the audio interactions in accordance with the classification of the audio types, i.e. storing the start and end times of each segment of a specific type within an interaction. Audio classifier component 14 utilizes a pre-defined audio classification or audio type tables 47 associated with the audio classification database 46. Subsequent to the classification and indexing process, audio classifier component 14 stores 39 the list of classified and indexed audio interactions into the audio classification database 46. The audio classification database 46 is then used by pre-analysis performance estimator and rule engine 18 in order to block the transfer of audio interactions or segments thereof of pre-defined types, particularly, for example, non-speech type segments, from being sent to the main audio analysis engines. The selective blocking of certain segment types contributes to exactitude and enhances the accuracy level of the audio analysis results produced by main audio analysis engines 20. Alternatively, for examples for reasons of continuity, an interaction is sent as a whole to an audio analysis engine, but the results reported on segments of predetermined types, for example various non-speech types, are ignored. The quality evaluation component 16 receives the audio signal from the audio source 10 and performs quality and integrity evaluation on the audio signal. A set of signal parameters or signal characteristics measurements associated with the audio segments are evaluated and the quality/integrity level of the signal is determined via the application of various algorithms. The algorithms are implemented as ordered sequences of computer programming commands or programming instructions embedded in software modules. The algorithms used for the evaluation of the signal parameters or signal characteristics are known in the art. The following signal parameters or signal characteristics measurements are evaluated and/or determined by the quality evaluator component 16: A) signal to noise ratio (SNR) or the calculation of the ratio between the energy level of the signal and the energy level of the noise; B) segmental signal to noise ratio; C) typical noise characteristics detected in the signal, such as for example, "white noise", "colored noise", "cocktail party noise", or the like; D) cross talk level, which is the degradation of the signal as a result of capacitive or inductive coupling between two lines; E) echo level and delay; F) channel distortion model; G) saturation level; H) network type, such as line, cellular, or hybrid, network switch type, such as analog or digital; I) compression type; J) source coherency, such as number of speakers, number of inter-speaker transitions, non-speech acoustic sources; K) estimated Mean Opinion Score (MOS); L) feedback level, and the like M) weighted quality score or the weighted estimation of all the above parameters. Pre-analysis performance estimator and rule engine 18 uses the results of audio classifier component 14 and the quality evaluator component 16 to manage the operation of main audio analysis engines 20 by controlling the input there into and by determining which audio interactions or segments thereof will be transferred to main audio analysis engines 20 for analysis and which will be discarded.

Still referring to FIG. 1 the function of main audio analysis engines 20 is to receive the filtered audio interactions or segments thereof as determined through the results of audio analysis pre-processor 12 and to apply selectively one or more main analysis algorithms included in audio analysis engines 22, 24, 26, 28 to the received audio interactions. Optionally one or more of the basic audio analysis engines 22, 24, 26, 28 comprise an engine-specific result certainty evaluator component, that indicates the certainty level of the self-produced results. The provided results, along with the certainty indications provided by analysis engines 22, 24, 26, 28 are stored 53 in an audio analysis results table 49 of audio analysis database 42.

Subsequently to the activation of engines 22, 24, 26, 28 the results of audio analysis engines 20 are transferred to audio analysis post-processor 34. Audio analysis post processor 34 could be set by the user at predetermined times to be in an active state or in an inactive state. Audio analysis post processor 34 could further be activated or deactivated per result, or per interaction, based on the certainty level evaluation performed by main audio analysis engines 20, the estimated quality results produced by quality evaluation component 16 or the environment requirements.

Still referring to FIG. 1 the function of audio analysis post-processor 34 is to further enhance the accuracy level of the results produced by main audio analysis engines 20. The audio analysis post processor 34 includes an analysis results certainty examiner component 36. Examiner component 36 examines and selectively analyzes further the output of main audio analysis engines 20. Examiner component 36 includes one or more algorithms, implemented as a set of ordered computer programming instructions embedded in software modules that determine whether the analysis results produced by main audio analysis engines 20 should be qualified for subsequent use, should be disqualified from subsequent use, or should be sent for verification (or re-analysis), in order to be verified or improved for subsequent use. The re-analysis could be performed by re-sending the results back 32 to main audio analysis engines 20 and applying the same algorithms of main audio analysis engines 20 while utilizing a different set of input parameters. Alternatively, the re-analysis or verification of a result can be done by a different algorithm implemented in the focused post analyzer component 38 that is designated for giving a "second opinion" on the main algorithm results. For example, the output of word spotting component 22 is typically a collection of words spotted within an interaction that are either identical or substantially similar to one or more words from a pre-prepared word list. A spotted word with low certainty indication, for example under 50% certainty, may be disqualified or rejected as a valid result. Alternatively, if the certainty is for example between 50 and 80% the spotted word can be sent for re-analysis with the same word-spotting engine using a different set of parameters or a different word-spotting or full transcription engine for verification. If the certainty is, for example in the range of 80-100% the word can be qualified without further analysis. The decision can further relate to additional parameters not directly related to the interaction, such as the word itself. For example, longer words or phrases are more likely to be recognized correctly than short words, which are likely to be confused with other short words or parts of words. For example, "good morning" is more likely to be recognized correctly than "hi", which can be confused with "I", "high", part of "allr-i-ght" and the like. The re-analysis or verification algorithms can work on the same audio interaction or segment thereof. Alternatively, the re-analysis or verification works only on those parts of the interaction in which the specific result to be verified was located. For example, when verifying spotted words, the whole interaction or segment thereof could be sent for re-analysis or only the fragments thereof where the spotted words were reported.

Still referring to FIG. 1 post analysis rules engine 40 implements rules regarding the results as established by main audio analysis engines 20, the results of focused post analyzer 38, and the environment. Note that a decision can be made regarding one or more specific results within a specific signal segment, such as one or more words detected by word spotter component 22, or one or more excitement levels detected by excitement detector component 24. The decision whether to qualify or disqualify results could be based on: predetermined engine certainty thresholds stored in threshold table 49; dynamic specific requirements of the environment, such as false alarm rate vs. miss-detections the user is willing to tolerate, or the workload of the infrastructure, such as the computing system wherein the proposed apparatus and method are operating, or the characteristics of the whole segments, as established in the pre-processing stage, such as the SNR level. For example, when the system workload is high, or the system is not efficient enough, the threshold value is lowered and results with lower certainty are qualified. In contrast, when the system is not highly loaded, or the system is highly efficient then the threshold values could be increased and results with low certainty will be either sent for re-analysis or verification, or disqualified altogether. Note should be taken that all the factors, rules, the activation order of the rules, thresholds, and the like are for the user of the system to determine, prioritize and set. Rule engine 40 merely follows the instructions and guidelines of the user as expressed by the rules.

Figure 2:
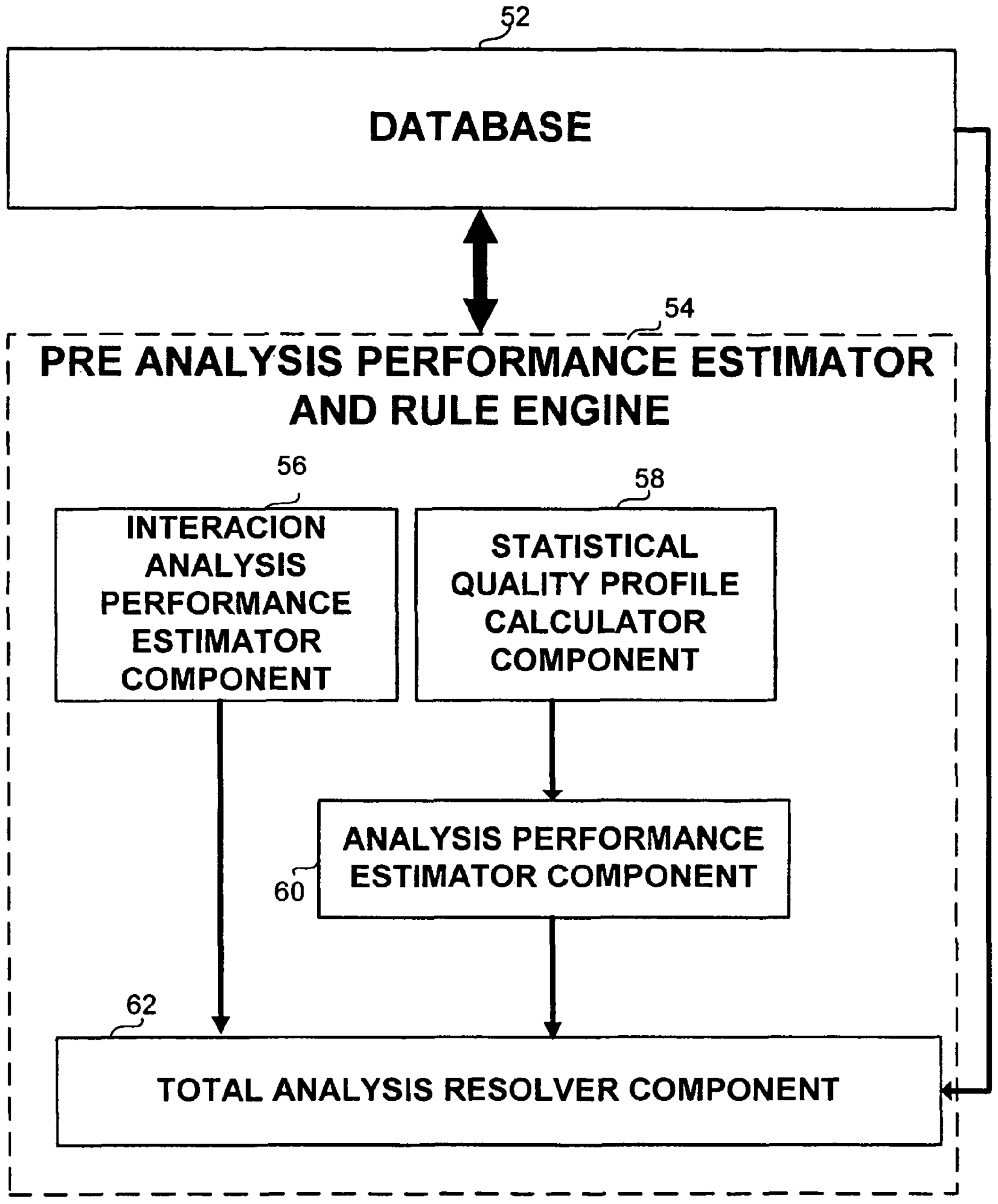
FIG. 2 is a schematic block diagram describing the components of the proposed audio analysis rules engine of the pre-processing stage in accordance with a preferred embodiment of the present invention.
Figure 3:
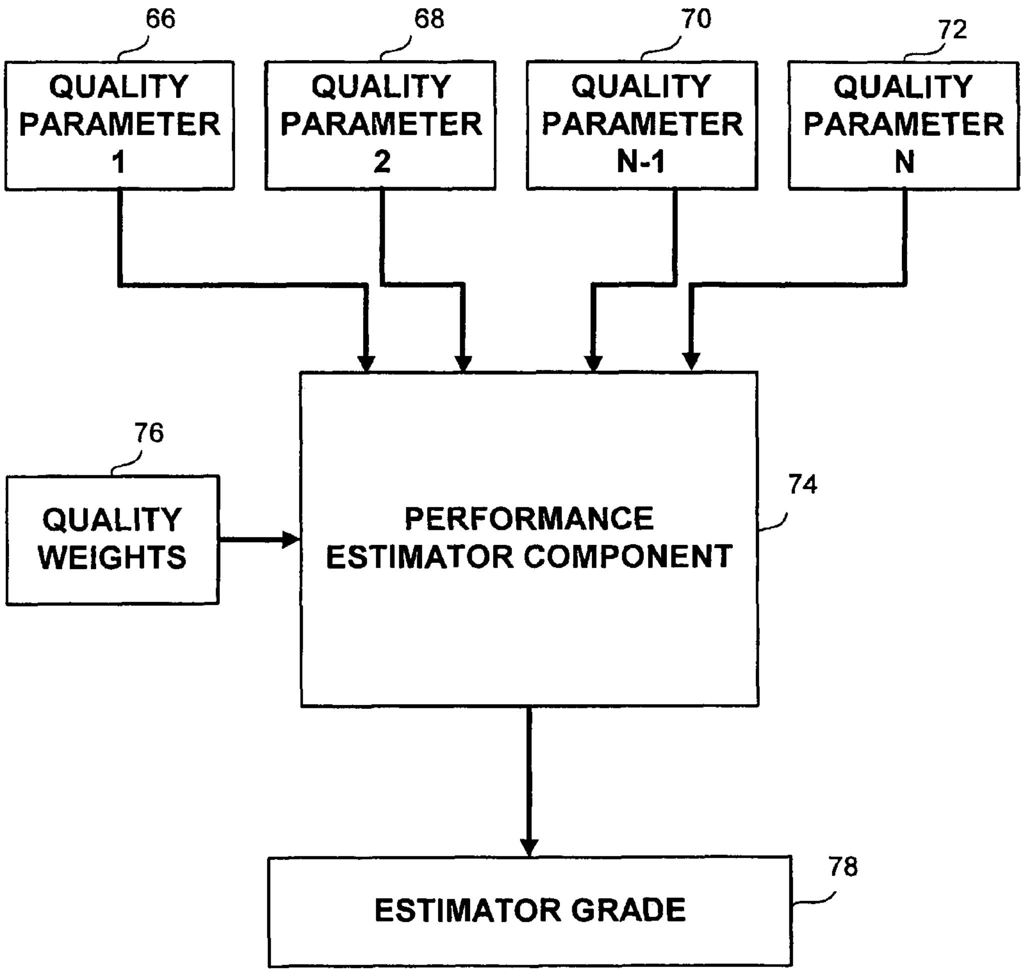
FIG. 3 is a schematic block diagram describing the inputs and outputs of the performance estimator component of the pre-processing stage, in accordance with a preferred embodiment of the present invention.

Referring now to FIG. 2 and FIG. 3, describing aspects of the pre-processing stage. FIG. 2 describes an audio pre-analysis performance estimator and rule engine 54, which is detailing pre-analysis performance estimator and rule engine 18 of FIG. 1. Estimator and engine 54 controls the input provided to main audio analysis engines 20 of FIG. 1 and thereby manages the operation of the main audio analysis engines 20 of FIG. 1. Estimator and engine 54 controls the amount of data that is analyzed for a pre-defined time frame, for purposes of quality calculation and for purposes of supporting different licensing options. Therefore, estimator and engine 54 determines which audio interactions or segments thereof will be transferred for further analysis and which will be discarded. Estimator and engine 54 is a set of software modules having varying functionality or a set of logically inter-related executable programming command sequences. Estimator and engine 54 includes an interaction performance analysis estimator component 56, a statistical quality profile calculator component 58, an analysis performance estimator component 60, and a total resolving component 62. Estimator and engine 54 is logically coupled to a database 52 which is part of audio analysis database 42 of FIG. 1, and to main audio analysis engines 20 of FIG. 1. Interaction analysis performance estimator component 56 estimates the accuracy level of the results expected from each of the speech analysis engines when processing an audio interaction or segment thereof. The higher the estimated accuracy, the higher the similarity between the generated results and the real results (which are not available). The results of the estimation process performed by estimator component 56 are based on the set of quality parameters, on the audio classification of the audio segment as done by audio classifier 14 of FIG. 1, and on metadata such as Computer Telephony Integration (CTI) data, providing information such as the calling number (landline or cellular), the called number, the type of handset used, and the like. Statistical quality profile calculator component 58 calculates the statistical profile of the working environment, i.e. the environment-wide statistics of the various quality parameters. In accordance with the statistical profile, analysis performance estimator component 60 issues statistical performance estimations for the environment. Total resolving component 62 determines which audio interactions will be sent to main audio analysis engines 20 of FIG. 1, and which will be discarded. The total resolving process is based on the estimated interaction analysis success level, the environment statistics, the amount of data to be analyzed per time frame, the CTI data, and the like. The task of total resolving component 62 is further detailed below.

Referring now to FIG. 3, a grade representing the estimated accuracy level is calculated separately for each audio analysis algorithm associated with a main audio analysis engine 22, 24, 26, 28 of FIG. 1. If the estimated audio analysis performance grade is high, it is likely that the produced results will be substantially correct and meaningful, so the system should run the specific algorithm. However, if the estimated grade is low, it is likely that the results produced by the algorithm are of low quality, and running the algorithm will not yield meaningful information, and can therefore be avoided. In the exemplary case when the grade is determined using linear prediction methods, the set of measured quality parameters of the audio interaction, as provided by the quality evaluator component 16 of FIG. 1, and a corresponding pre-determined set of quality weights (which depends on the specific audio analysis algorithm considered) are inserted into a linear prediction system to yield the estimated audio analysis performance grade. Alternatively, the estimation system could use a neural network, or the like. In the case of linear prediction the weight associated with each quality parameter represents the relative sensitivity of the specific audio analysis algorithm to this quality parameter Still referring to FIG. 3, engine-specific performance estimator component 74 is fed by a set of quality parameter values, such as quality parameter 1 (66), quality parameter 2 (68), quality parameter N-1 (70), and quality parameter N (72). The quality parameters are as detailed in the quality evaluation component 16 of FIG. 1, such as signal to noise ratio, echo level, and the like. In addition, quality weights 76 corresponding to the quality parameters 66, 68, 70, and 72 and associated with the specific engine are fed into the performance estimator component 74. Estimator component 74 outputs an estimated grade value 78. In the case of linear prediction, the calculation is represented by the following formula, representing a weighted summation:

$$G = 1 - \sum_{i=1}^{N} w_i Q_i$$

Where G is the resulting estimator grade 78, N is the number of quality parameters, as appearing in quality parameters table 45 of audio analysis database 42 of FIG. 1, i is the serial number of the quality parameter, $Q_i$ is the value of the i-th quality parameter and $w_i$ is the weight of the i-th quality parameter 76. The weights $Q_i$ take into account the sensitivity of each algorithm to each quality parameter. For example, an audio interaction containing a high echo level should not be sent for analysis to an algorithm that is highly sensitive to echo, such as emotion detection. Therefore, the weight assigned to the echo level for this specific algorithm will be substantially higher than the weight assigned to other parameters. The high weight, combined with a high value of echo level for such interaction yields an overall low estimated performance and the interaction is not likely to be sent to an emotion detection engine.

Still referring to the case of linear estimation, the set of weights $Q_i$ to be used, is obtained independently for each audio analysis engine during a training phase of the system. The goal is to determine a set of weights, such that the weighted sum of the quality parameters associated with an interaction will provide an estimation for the quality of the results that will be provided by the engines when analyzing the interaction. The quality of the results is the extent to which the engines' results are close to the real, i.e., human generated results (which are known only during the training phase and not during run-time, which is why the estimation is needed). When comparing the results of the relevant algorithm to manually produced reference results, during the training phase, a correctness factor is determined for each trained segment. Under the linear prediction model, the system searches for a set of weights $Q_i$, such that the weighted summation $$\sum_{i=1}^{N} w_i Q_i$$

of the quality parameters of the interaction with the weights, estimates the correctness factor for the trained segments. After the weights have been determined during the training phase, the system calculates in run-time the weighted sum for an interaction, thus estimating the performance of the algorithm, i.e. how well the algorithm is expected to provide the correct results, and hence the worthiness of running the algorithm.

Referring now back to FIG. 2, the calculation of statistical quality profile calculator component 58 generates a statistical quality profile associated with the working environment, based on the quality parameters of the audio interactions. The statistical quality profile incorporates statistical parameters, such as the expectancy and variance of each of the quality parameters as stored in quality parameters table 45 of database 42. The statistical quality profile is updated periodically at pre-defined time intervals, for example every 15 minutes. When updating the profile, the parameters of newly analyzed interactions are added to the profile, while the parameters of old interactions are eliminated or their relative importance is degraded. Associated with each audio analysis engine, is a grade derived from the statistical quality profile that represents the estimated average analysis performance level of the engine. The grade is fed into total analysis resolving component 62. Interaction performance estimator component 56 produces a grade representing the estimated analysis results for the interaction. Total analysis resolving component 62 determines whether to continue the analysis of the current interaction. The decision is made in order to achieve optimal accuracy and performance, taking into account the capacity limitations of the computing infrastructure. The decision is based on the current interaction performance estimation, the working environment profile performance estimation, the amount of data to be analyzed within a pre-determined time frame, the processing power of the hardware associated with the infrastructure, and metadata such as CTI information. For example, if the estimated performance for a certain interaction is lower than the average estimated grade and if the amount of data analyzed during the relevant time-frame is lower than the amount of data that should be analyzed according to the predefined quota this interaction will be analyzed in order to accomplish the required amount of analyzed data. However, if the system meets its predefined analysis quota, this specific sub-optimal (in terms of estimated performance) interaction will be discarded. Examples for the data, guidelines and rules utilized by total analysis resolving component 62 are described below. However, any subset or additional data, guidelines and rules, in any order, using any thresholds levels as determined by the user, can be used as well. A) CTI data, such as segments length limitation, number of hold segments, transfer events, and the like. B) The current interaction performance estimation as compared against a predetermined threshold value. If the performance estimation value is above the value of the pre-determined threshold then the interaction will be sent for further analysis. The user of the proposed apparatus sets the minimum allowed performance level of the system. C) The abovementioned threshold value is adaptive and modified in accordance with the amount of data that needs to be analyzed. When the system did not perform the amount of analysis expected at the relevant time-frame, the threshold value is lowered so that the system is tolerant to lower quality performance, in order to complete the predefined analysis quota. In other words, the system is less selective and therefore the amount of analyzed audio per time frame is increased. If the system exceeded the amount of analysis expected at the relevant time-frame, the threshold value is increased in order to accept only higher quality results and therefore higher performance. Thus, the optimum system analysis performance is achieved through continuous consideration of the system's capacity. D) The estimated interaction performance is compared with the environment's performance estimation, in order to assure top quality analysis performance. Thus, for example, in accordance with a specific threshold value setting, only audio segments with results accuracy estimation that is at the top 20% of the environment's performance estimation will be analyzed E) When at least one quality parameter of an interaction is low, a pre-process stage of quality enhancement can be performed. One example relates to the elimination of an echo from the signal, by performing echo cancellation where the signal contains a substantially high echo. In another example noise reduction could be performed where severe noise is present in the signal. The decision to perform quality enhancement is made specifically for each main audio analysis engine, according to the specific sensitivities of each algorithm to the different quality parameters. G) A decision concerning the activation or deactivation of enhancement pre-processing could be based on the working environment statistical quality profile, for example if the statistical quality profile suggests an overall noisy audio environment, a noise enhancement process could be activated.

Any combination of parts of the disclosed invention can be used. A user can choose to implement the pre-processing, or the post-processing or both. Additional or different quality parameters than those presented, different estimation methods, various environment parameters and thresholds can be used, and various rules can be applied, both in the pre-processing stage and in the post-processing stage.

The presented apparatus and method disclose a three-stage method for enhanced audio analysis process for audio interaction intensive environments. The method estimates the performance of the different engines on specific interactions or segments thereof and selectively sends the interaction to the engines, if the expected results are meaningful. The average environment parameters are evaluated as well, so as to set the optimal working point in terms of maximal analysis results accuracy and the use of the available processing power. It will be appreciated by persons skilled in the art that the present invention is not limited to what has been particularly shown and described hereinabove. Rather the scope of the present invention is defined only by the claims which follow.

What is claimed is:

1. A method for improving the accuracy level of an at least one audio analysis engine designed to process an at least one audio interaction segment captured in an environment, the method comprising the steps of:

pre-processing the at least one audio interaction segment, said pre-processing comprising estimating a quality parameter associated with the at least one audio analysis engine;

determining to transfer based on the pre-processing results, the at least one audio interaction segment for analysis by the at least one audio analysis engine;

analyzing the at least one audio interaction segment by the at least one audio analysis engine, the at least on audio analysis engine providing at least one result based upon the analysis algorithms;

post-processing the at least one result of the at least one audio analysis engine processing the at least one audio interaction segment; and based on said post-processing, determining whether to qualify or disqualify, the at least one result, thus improving the accuracy level of the at least one audio analysis engine.

2. The method of claim 1 wherein the environment is a call center or a financial institution.

3. The method of claim 1 wherein the quality parameter is estimated based on at least one item selected from the group consisting of: at least one result of pre-processing of the at least one audio interaction segment; the at least one audio analysis engine; at least one threshold; and estimated integrity of the at least one audio interaction segment.

4. The method of claim 3 wherein the threshold is associated with workload within the environment.

5. The method of claim 3 wherein the threshold is associated with environmental estimated performance of the at least one audio analysis engine.

6. The method of claim 1 further comprising the step of classifying an at least one audio interaction into segments.

7. The method of claim 6 wherein the segments are of predefined types, to include any one of the following: speech, music, tones, noise, or silence.

8. The method of claim 1 further comprising the step of discarding the at least one result of the at least one audio analysis engine processing the at least one audio segment.

9. The method of claim 1 further comprising a step of determining an at least one environmental estimated performance of the at least one audio analysis engine.

10. The method of claim 1 wherein the accuracy of the at least one audio analysis engine is determined by an at least one quality parameter of the audio signal of the at least one audio interaction segment.

11. The method of claim 10 wherein the accuracy of the at least one audio analysis engine is determined by a weighted sum of the at least one quality parameter of the audio signal of the at least one audio interaction segment.

12. The method of claim 11 wherein the weighted sum employs weights acquired during a training stage.

13. The method of claim 11 wherein the weighted sum employs weights determined using linear prediction.

14. The method of claim 1 wherein post-processing the at least one result comprises at least one of the group consisting of: verifying the at least one result with an at least one second audio analysis engine; receiving a certainty level provided by the at least one audio analysis engine for the at least one result; calculating the workload of the environment; calculating the results previously acquired in the environment; and receiving the computer telephony information related to the at least one audio interaction segment.

15. An apparatus for improving an accuracy levels of an at least one audio analysis engine designed to process an at least one audio interaction segment captured in an environment, the apparatus comprising:

a pre-processor comprising:

a quality evaluator component for determining the quality of the at least one audio interaction segment; and a pre-analysis performance estimator and rule engine component for estimating a quality parameter associated with the at least one audio analysis engine designed to process the at least one audio interaction segment prior to processing the at least one audio interaction segment by the at least one audio analysis engine and passing the at least one audio interaction segment to the at least one audio analysis engine according to an at least one rule; and a post-processing rule engine for determining whether to qualify or disqualify, at least one result reported by the at least one audio analysis engine processing the at least one audio interaction segment.

16. The apparatus of claim 15 wherein the environment is a call center or a financial institution.

17. The apparatus of claim 15 wherein the pre-analysis performance estimator and rule engine component compares the quality parameter estimated to an at least one threshold.

18. The apparatus of claim 15 further comprising an audio classification component for classifying an at least one audio interaction into segments.

19. The apparatus of claim 15 further comprising a component for determining an at least one environmental estimated performance of the at least one audio analysis engine.

20. The apparatus of claim 15 further comprising an audio interaction analysis performance estimator component for determining a value of an at last one quality parameter for the at least one audio interaction segment.

21. The apparatus of claim 15 further comprising a statistical quality profile calculator component for generating a statistical quality profile of the environment.

22. The apparatus of claim 21 wherein the statistical quality profile calculator component determines an at least one weight to be associated with an at least one quality parameter.

23. The apparatus of claim 21 further comprising an analysis performance estimator for estimating environmental performance of the at least one audio analysis engine.

24. The apparatus of claim 15 further comprising a database.

25. The apparatus of claim 15 further comprising a results certainty examiner component for determining the certainty of the at least one result.

26. The apparatus of claim 15 further comprising a focused post analyzer component for re-analyzing the at least one result.

27. The apparatus of claim 15 wherein the rule engine comprises at least one rule for considering workload within the environment.

28. The apparatus of claim 15 wherein the pre-analysis performance estimator and rule engine or the post-processing rule engine comprises at least one rule for considering the results previously acquired in the environment.

29. The apparatus of claim 15 wherein the pre-analysis performance estimator and rule engine or the post-processing rule engine comprises at least one rule for considering computer telephony information related to the at least one interaction.

30. The apparatus of claim 15 further comprising: a quality evaluator component for determining the quality of the at least one audio interaction segment.

31. The method of claim 1 wherein the at least one audio analysis engine is a recognition engine.

32. The method of claim 31 wherein the recognition engine is selected from the group consisting of a word spotting engine, an excitement detecting engine, a call flow analyzer, a voice recognition engine, a full transcription engine, and a topic identification engine.

33. The apparatus of claim 15 wherein the at least one audio analysis engine is a recognition engine.

34. The apparatus of claim 33 wherein the recognition engine is selected from the group consisting of a word spotting engine, an excitement detecting engine, a call flow analyzer, a voice recognition engine, a full transcription engine, and a topic identification engine.

* * * * *